United States Patent [19]
Drexler

[11] Patent Number: 5,106,105
[45] Date of Patent: Apr. 21, 1992

[54] ROTARY KILN SEAL

[75] Inventor: Robert L. Drexler, Idaho Falls, Id.

[73] Assignee: United States Department of Energy, Washington, D.C.

[21] Appl. No.: 599,818

[22] Filed: Oct. 17, 1990

[51] Int. Cl.⁵ .......................... F16J 15/00; F27B 7/24
[52] U.S. Cl. ...................................... 277/3; 277/81 S; 277/88; 432/115
[58] Field of Search .................... 277/3, 192, 81 S, 88; 432/115; 34/242

[56] References Cited

U.S. PATENT DOCUMENTS

| | | | |
|---|---|---|---|
| 2,828,983 | 4/1958 | Hunt | 277/81 S |
| 3,383,115 | 5/1968 | Eckley et al. | 277/192 |
| 3,667,626 | 6/1972 | Torelli et al. | 34/242 |
| 3,724,887 | 4/1973 | Roberts | 34/242 |
| 4,071,253 | 1/1978 | Heinen et al. | 277/88 |
| 4,084,634 | 4/1978 | Handa | 277/81 S |
| 4,193,756 | 3/1980 | Leon | 34/242 |
| 4,406,464 | 9/1983 | Schymura | 432/115 |
| 4,598,913 | 7/1986 | Kotzur | 277/88 |
| 4,813,689 | 3/1989 | Stalter et al. | 277/88 |

FOREIGN PATENT DOCUMENTS 1325276  7/1987  U.S.S.R. .............................. 432/115

OTHER PUBLICATIONS

Prepp Operating Experience and Status, R. L. Drexler, Technical Specialty Meeting, Power Reactor and Nuclear Fuel Development Corp., Japan, 17–20 Oct. 1989.
Prepp Rotary Kiln Seals-Problem and Resolution, R. L. Drexler, Incineration Conference, Univ. of Calif. at Irving, 16 May 1990.

*Primary Examiner*—William A. Cuchlinski, Jr.
*Assistant Examiner*—Daniel G. DePumpo
*Attorney, Agent, or Firm*—Bradley W. Smith; John M. Albrecht; William R. Moser

[57] ABSTRACT

A rotary seal used to prevent the escape of contaminates from a rotating kiln incinerator. The rotating seal combines a rotating disc plate which is attached to the rotating kiln shell and four sets of non-rotating carbon seal bars housed in a primary and secondary housing and which rub on the sides of the disc. A seal air system is used to create a positive pressure in a chamber between the primary and secondary seals to create a positive air flow into the contaminated gas chamber. The seal air system also employs an air inlet located between the secondary and tertiary seals to further insure that no contaminates pass the seal and enter the external environment and to provide makeup air for the air which flows into the contaminated gas chamber. The pressure exerted by the seal bars on the rotating disc is controlled by means of a preload spring. The seal is capable of operating in a thermally changing environment where the both radial expansion and axial movement of the rotating kiln do not result in the failure of the seal.

10 Claims, 6 Drawing Sheets

ROTARY KILN SEAL

CONTRACTUAL ORIGIN OF THE INVENTION

The United States Government has rights in this invention pursuant to Contract No. DE-AC07-76ID01570 between the United States Department of Energy and EG&G Idaho, Inc.

BACKGROUND OF THE INVENTION

Conventional incinerating kilns operate at a slight negative pressure and employ relatively simple seals to control the leakage of outside air into the kiln. However, when a kiln is used to thermally process mixed hazardous and low level transuranic wastes the sealing requirements become much more stringent due to the need to prevent the spread of contaminated material generated by the kiln to the outside environment. As a result of this requirement, a special positive seal system is necessary. One possible method of achieving this level of containment involves formulating the seal assemblage in a manner which places as a minimum three independent seals in series with the outlet from a seal air system located between the primary and secondary seal and with an inlet located between the secondary and tertiary seal. This arrangement results in the outlet chamber, between the primary and the second secondary seals, being pressurized significantly above kiln pressure, such that any leakage past the primary seal would be into the kiln. In addition, any leakage past the secondary seal would move into the inlet chamber, located between the secondary and tertiary seals, where air is pulled into the seal air system and thus, still be retained inside the tertiary seal.

The air scavenged by the seal air system from the inlet chamber passes through a cooler and a HEPA filter and then returns to the inlet chamber using a positive displacement blower. This bypass loop is used to establish and maintain the specified pressure in the outlet chamber. Intentional leakage in through the tertiary seal balances the system providing make up air for that lost into the kiln. This triple seal arrangement prevents back flow from the kiln during normal negative pressure operation, during potential abnormal positive pressure transients and during shutdown conditions.

Normal rotary kiln operating pressure is approximately 1 mm Hg (0.5 in. water) negative with respect to the kiln room. The hypothetical positive pressure transient for a seal air system design is 517 mm Hg (10 psi) positive.

The rotary kiln has several features which affect the seal and therefore, must be taken into consideration. First, during its operation, the kiln rotates around an axis which is typically inclined 2 degrees from the horizontal, and as the kiln rotates, it can experience an axial displacement of up to one inch. Second, the waste material undergoing incineration requires about one hour to traverse the length of the kiln during which time the material is heated to a temperature of 1800 degrees F. In normal operation, the kiln temperature ranges from 300 to 400 degrees F along its length between the seals at either end of the kiln. Thermal expansion of the kiln shell increases its length by approximately 0.58 in. between the seals when going from the cold to hot operating condition. Also, while undergoing this temperature variation, the shell diameter increases 0.30 in. Thermal expansion of the apparatus used to rotate the kiln causes the entire kiln to expand upward in going from a cold to hot condition by 0.1 in. These conditions lead to a series of motion requirements affecting a kiln seal which can be summarized as follows:

a. Rotation of the kiln shell;
b. Axial motion of the kiln shell of approximately 1.0 in.;
c. Axial expansion of the kiln shell approximately 0.58 in. between feed and discharge end seals;
d. Diametral expansion of the kiln shell due to thermal expansion approximately 0.30 in.;
e. Vertical displacement of the kiln center of rotation of approximately 0.10 in. at both seals.

The previous seal design experienced a number of deficiencies when subjected to the seal motion requirements listed above. These deficiencies included: an inability to accommodate the vertical shift of the center of rotation of the kiln, excess air leaking into the kiln through the seals, and thermal stresses on a thermal sleeve which separates the room environment from the kiln gas. These deficiencies resulted in failure of the seal under operating conditions. Therefore, it is the object of this invention to provide a rotating kiln seal which will reliably operate under the above listed conditions while preventing leakage of contaminants generated by the incinerated waste.

A further object of this invention is to provide a seal which will operate under the inherent operating temperatures of the kiln and its exterior shell.

A further object of this invention is to provide a seal design employing a seal air system.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The rotary kiln seal combines a rotating disc plate attached to the kiln shell and four sets of non-rotating carbon seal bars, two sets each of which are mounted in a primary and secondary housing respectively. The housings combine by means of connecting member to form a single unit which envelops the disc in such a manner that the sets of carbon bars rub the sides of the rotating disc plate. The primary housing is linked to the kiln end structures by a flexible membrane to complete the seal. The primary and secondary seals are formed by a circular arrangement of overlapping carbon bars while the tertiary and quad seals comprise rings of carbon bars arranged end to end in a butt joint fashion. The bars are seated in the housing by means of a high temperature silicone RTV. The tertiary and quad seals serve to protect the primary and secondary seals from foreign matter and to distribute the air into and out of the seal air system. The carbon seals which are bound to the nonrotating primary and secondary housings are continuously spring loaded against the rotating disc plate to maintain a constant and controlled pressure on the seal surfaces and to automatically compensate for seal wear. A second membrane joins the primary and secondary housing and the rotating disc plate to create a chamber which is pressurized with clean air from the seal air system to preclude leakage from the kiln to the external environment. The housing is mounted in a manner to allow the seal to follow any axial movement of the kiln. Differential movements between the kiln and the housing in the radial direction are compensated for by proper sizing of the rotating disc plate relative to the seals. The rotating disc plate is attached to the kiln shell through a thermal stand-off structure. The disc is cradled in the stand-off and bonded to it by means of a bed of high temperature silicone RTV. This apparatus provides a positive seal against environmental contamination while allowing movement axially and radially with respect to the rotating kiln.

DETAILED DESCRIPTION OF THE INVENTION

Figure 1:
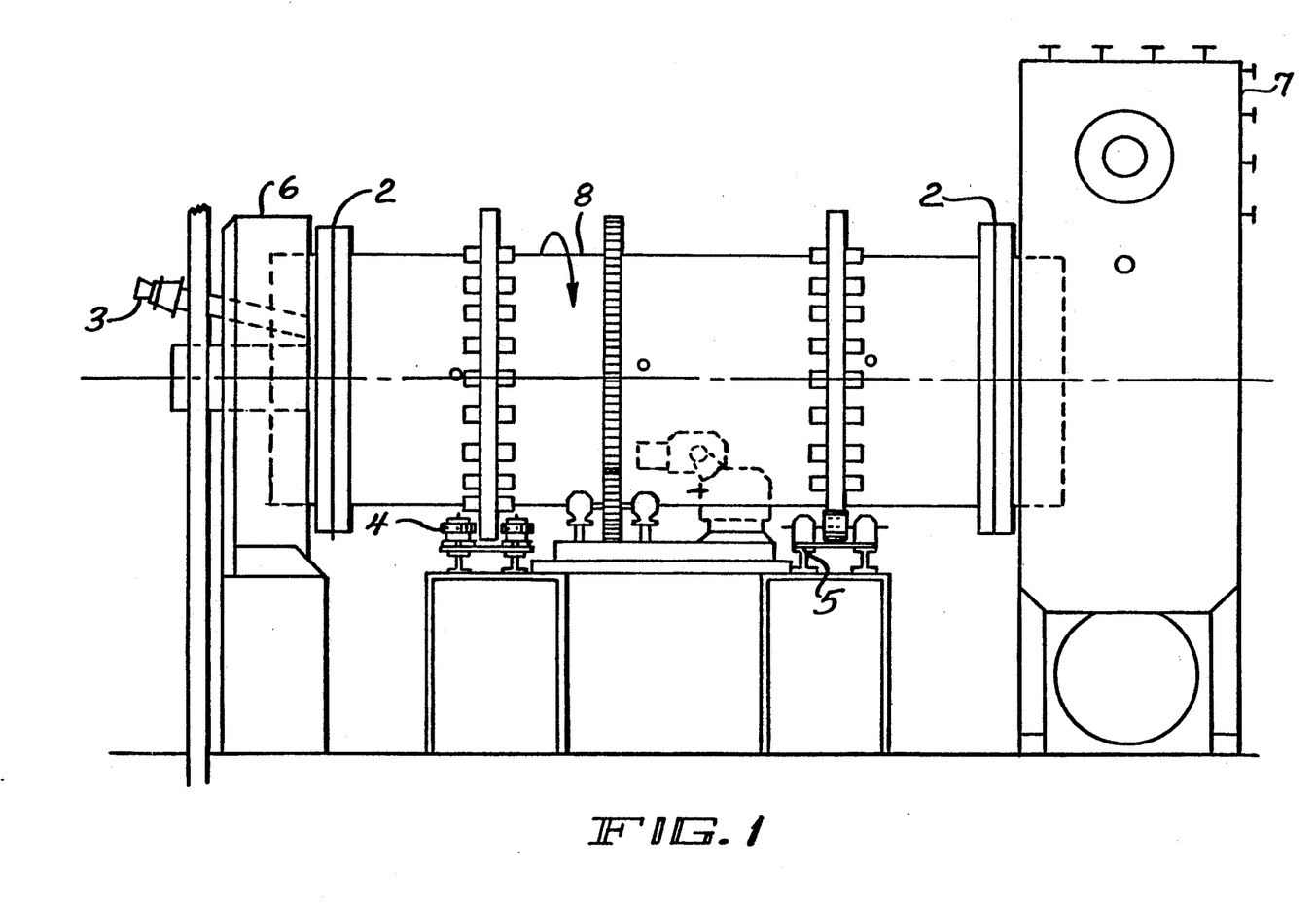
FIG. 1 depicts the Process Experimental Pilot Plant rotary kiln.

The present invention, a rotary kiln seal, will be described in detail as it is used in conjunction with the Process Experimental Pilot Plant. The plant thermally processes mixed hazardous and low level transuranic wastes. The rotary kiln seal is part of the rotary kiln incinerator and serves to prevent the leakage of contaminants from the kiln to the external environment during incineration. Due to the dynamic motion of the kiln associated with its rotation and the thermal expansion of the kiln shell associated with its large temperature variation in going from an ambient temperature to a high operating temperature and its axial temperature gradient, the seal must be able to provide for movement axially and radially with respect to the rotating kiln and still maintain a positive seal. FIG. 1 depicts the rotary kiln, 1, in relation to the two sets of seals, 2, one located adjacent to the feed end of the kiln and the other located adjacent to the discharge end of the kiln. The kiln burner, 3, is the heat source used to incinerate the waste. The thrust rollers, 4, restrict the movement of the kiln in the axial direction. Support rollers, 5, at each end support the kiln, 1. The firing hood, 6, along with the secondary combustion chamber, 7, are fixed nonrotating structures, respectively located at opposite ends of the rotating kiln shell, 8, and serve as seal attachment surfaces for the nonrotating portion of the rotary kiln seals.

Figure 2:
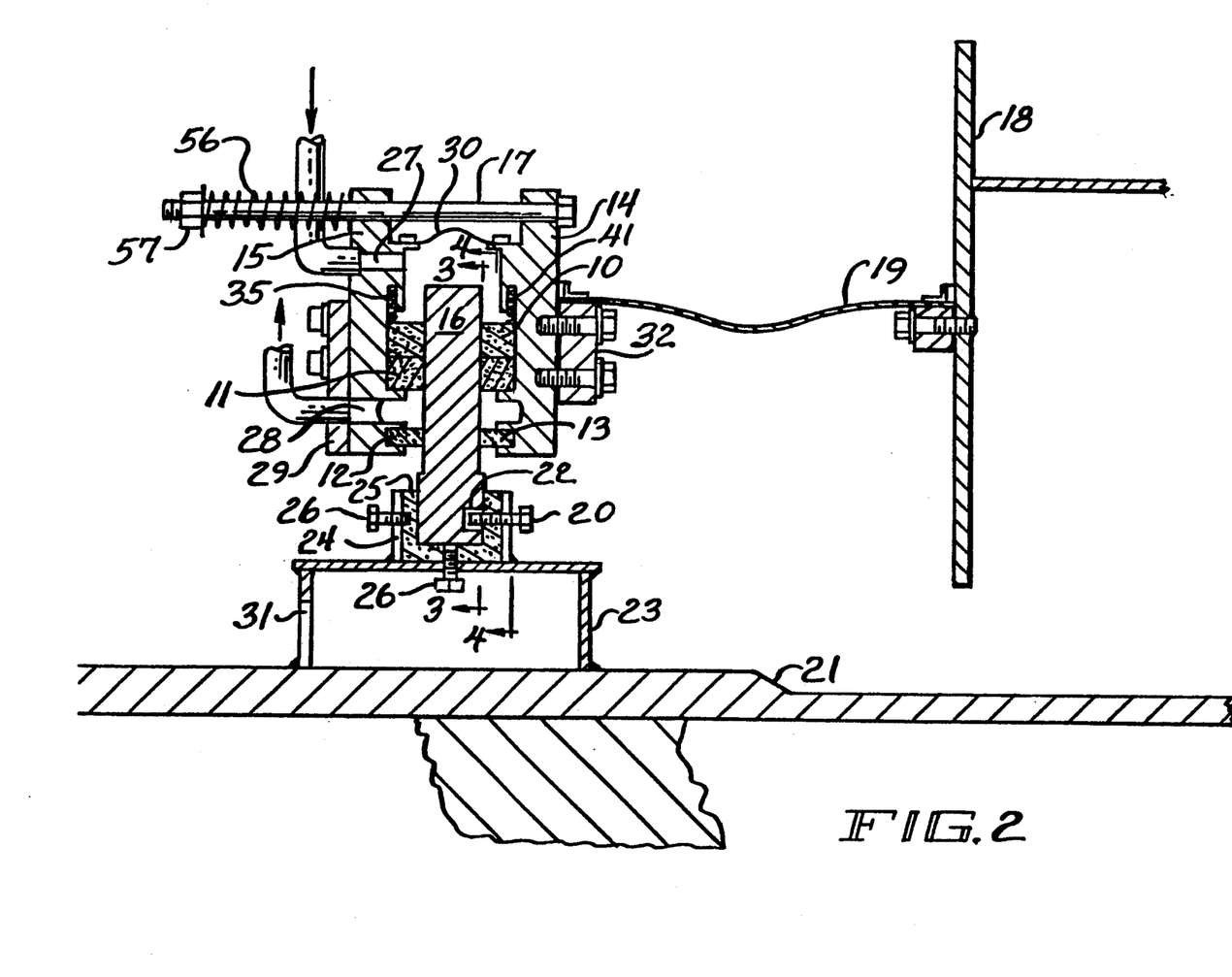
FIG. 2 shows the longitudinal cross section of the rotary kiln seal.

FIG. 2 depicts the cross section of the rotary kiln seal assembly sectioned along the axis of the kiln. The graphite carbon primary seal bars, 10, and quad seal bars, 13, are mounted in the primary housing, 14, and graphite carbon secondary seal bars, 11, and tertiary seal bars, 12, are mounted in the secondary housing, 15. The primary housing, 14, and the secondary housing, 15, are jointed by a spring loaded connecting member, 17, to form the completed housing which envelops a rotary disc plate, 16, integrally attached to the kiln shell, 21. The primary housing, 14, is linked to one of the kiln end structures either the firing hood, 6, or secondary combustion chamber, 7, by expansion joint type compliant membranes, 19, with a similar arrangement at the other end of the kiln.

Figure 7:
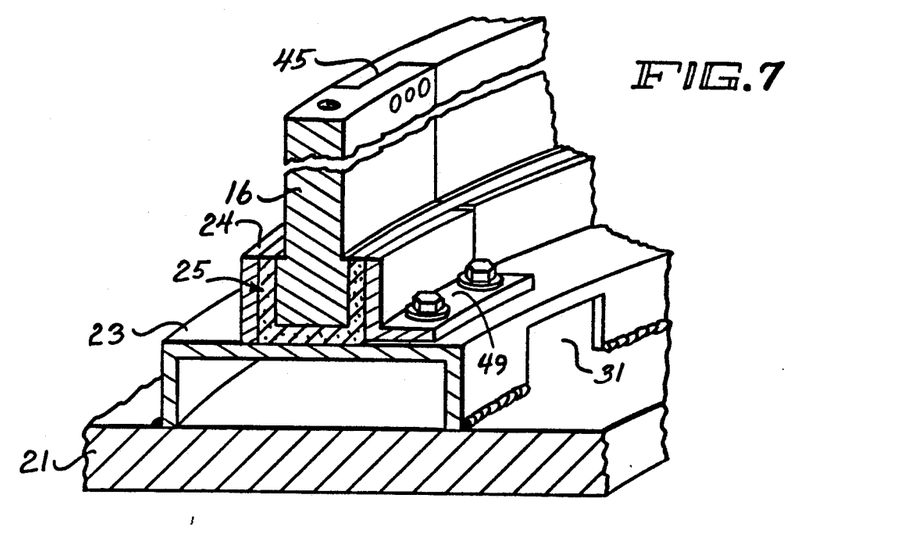
FIG. 7 shows the access opening for rotary disc plate.

The rotating disc, 16, is attached to the kiln shell, 21, through a thermal standoff structure, 23. The thermal standoff, 23, is a continuous, inward facing, arcuate channel shaped, welded steel structure, surrounding the kiln shell, 21, with the channel ends welded to and about the circumference of the kiln shell, 21. A pair of outward facing flanges, 24, cradle the disc, 16, in a bed of high temperature silicone RTV, 25. Adjusting screws, 26 and drive key adjusting screw, 20, penetrate the flanges and the web of the channel and are used to center and align the disc, 16, with the axis and the centerline of the kiln. After properly positioning the disc, 16, the high temperature silicone RTV, 25, is applied and allowed to cure at which point the adjusting screws are backed out a short distance, leaving the disc supported by the RTV without metal to metal contact. Access to adjusting screw, 26, interior to the channel, 23, is achieved through an access opening, 31, cut into the side of the channel, 23, as depicted in FIG. 7. Several of the drive key adjusting screws, 20, are only partially backed out of the recesses in the sides of the disc, such that they could serve as keys independent of the bond between the disc and the high temperature silicone RTV. If the RTV bond should ever fail to rotate the disc against the seal drag, the drive key adjusting screws, 20, would contact the sides of the counterbore, 22, in the disc and maintain disc rotation.

The high temperature silicone RTV, 25, is a two-part mix, GE RTV-88 or equivalent, high temperature silicone rubber which is rated for continuous use at 500 degrees F and has a 850 psi tensile strength. Based on worst case calculations, the thermal standoff, 23, temperature is expected to be no higher than approximately 310 degrees F with the RTV, 25, stresses less than 100 psi.

The RTV mounting of the disc greatly reduces the mechanical loads resulting from the kiln shell expansion and thermal load from heat transfer, which is important in allowing the disc, 16, to remain flat and virtually undistorted for optimum contact with the carbon seal bars.

A closed loop seal air system, known in the art, is used to supply pressurized clean air to the rotary kiln seal and to scavenge from the rotary kiln seal any potentially contaminated air which passes the secondary seal or any environmental air which passes the tertiary seal. The outlet port for the seal air system, 27, transgresses the secondary housing, 15, and empties into a chamber formed by the primary housing, 14, the secondary housing, 15, a superior sealing membrane, 30, the disc, 16, and the primary carbon seal bars, 10 and the secondary carbon seal bars, 11. The inlet port, 28, of the seal air system also transgresses the secondary housing, 15, and draws air from a chamber formed by the secondary housing, 15, the disc, 16, the secondary seal bars, 11, and the tertiary seal bars, 12.

Each of the housings, the primary housing, 14, and the secondary housing, 15, are formed from two semicircular segments to permit their installment around the circumference of the rotary kiln shell, 8. A set of housing splice plates, 29, is used to splice the two semicircular halves of the secondary housing together to form the completed circular housing. For the primary housing, 14, a bolted ring, 32, secures the two halves. The ring bolt, 32, is the point of attachment of the expansion joint, 19, to the nonrotating portion of the seal, as it encircles the kiln shell, 21.

Figure 3:
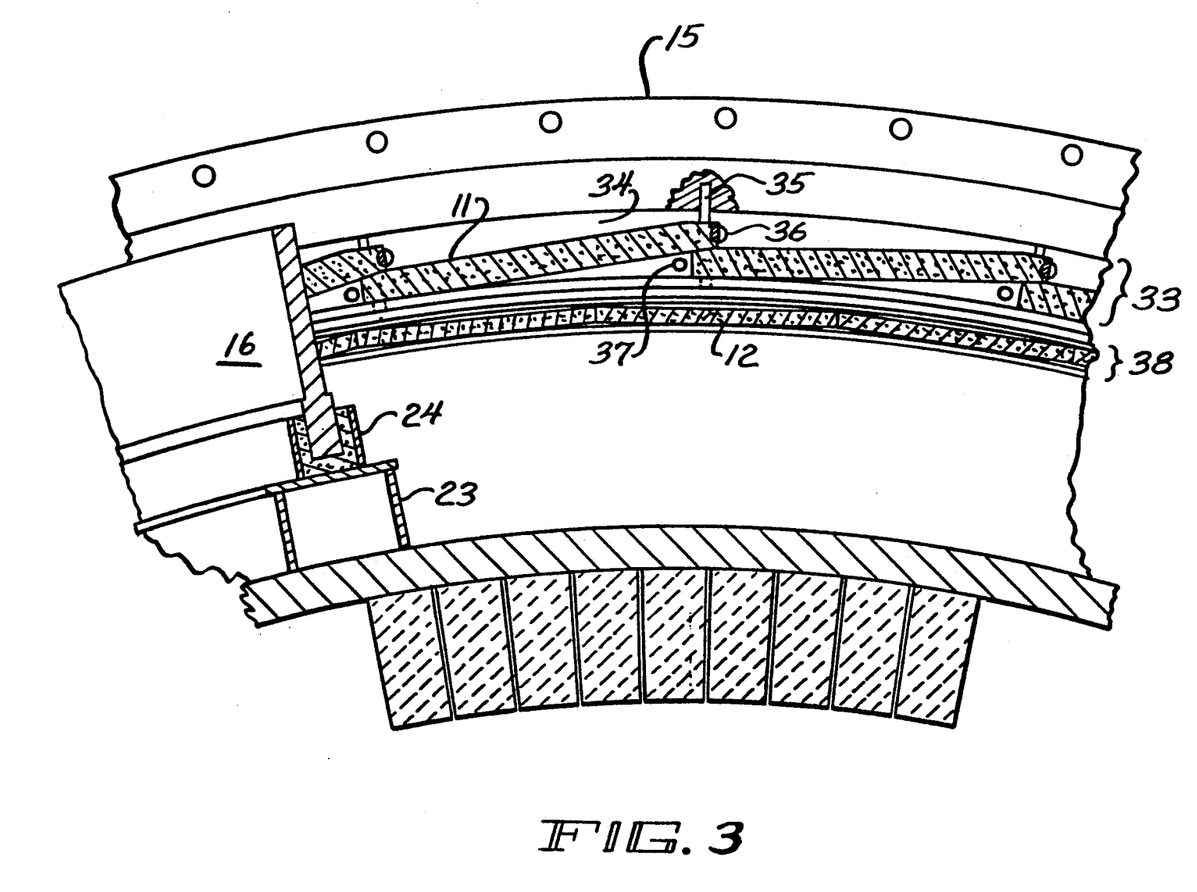
FIG. 3 is a cross sectional view taken along line 3—3 of FIG. 2 and depicts the positioning of the carbon seal bars as they appear in the secondary housing in their relation to the rotary disc plate.

FIG. 3 displays some of the secondary carbon seal bars, 11, and tertiary carbon seal bars, 12, within the secondary seal housing, 15. The secondary carbon seal bars, 11, of the secondary seal, 33, are seated in a groove, 34, in the secondary seal housing, 15, and are joined one to the other through a lap joint arrangement. Springs, 35, are aligned directly over the lap joints and press against the top bar with the result that the lower bar in the lap joint presses against the bottom edge of the groove, 34. The bars are further surrounded by a bed of high temperature silicone RTV which serves to seal the bars to the housing, 15. In addition, there are stop pins, 36, imbedded in the housing, 15, for each carbon bar, 11, to establish and maintain the position of the carbon bar within the housing groove, 34. The stop pins, 36, have a full diameter flat machined into the exposed part of the pin. This flat provides a large bearing area in contact with the flat end of the carbon bar, 11, to further restrict its movement. The fit of the brass stop pin, 36, will tighten slightly in the steel housing, 15, due to differential in thermal expansion at the operating temperature. The carbon bar, 11, which overlaps half of the unexposed portion of the pin, 36, retains the pin in the housing. The pin, 36, length is such that the pin will not contact the rotating disc even with fully worn carbon bars. The pin, 36, will maintain the carbon bar, 11, in its correct location, resisting the drag force of the rotating disc plate, 16, even if the adhesion supplied by the silicone RTV interposed between the carbon bar, 11, and the housing, 15, is lost.

The coil spring, 35, located over each lap joint between carbon bars, 11, provides a nominal 10 pound force to aid in maintaining a tight fit of the lap joint under the following conditions: a) during assembly and lapping of the joint, b) maintaining lap joint contact without seal air pressure, and c) maintaining general joint configuration in the event of a broken carbon bar, 11.

The small pins, 37, located in the housing just inside of the lap joint are spring pins and are used to insure against unstacking of the carbon bars, 11, in the event of combined loss of the silicone RTV bond and inadvertent reversal of the kiln rotation. The pins are seated deep into the housings to prevent contact with the disc even with fully worn carbon bars, 11.

The thermal expansion coefficient of the carbon bar material is less than one-fourth that of the carbon steel housings. At the nominal 116 inch diameter, this amounts to approximately 0.39 inches circumferential difference at the calculated 230 degrees F operating temperature. This difference is accommodated by a sliding motion at the lap joints, with each carbon bar moving 0.012 inch with respect to the other carbon bar. The silicone RTV layer between the carbon bars and the steel housings can easily accommodate this motion across the 0.070 in. thick layer of RTV. Since the 0.012 in. relative motion between carbon bars is essentially parallel to the lap joint, the seal across the lap joint is unbroken. Contact force on the lap joint faces is maintained by the coil spring in the housing (10 lb), the seal air pressure (12 lb), a small component of the disc friction drag (1 lb), and resistance of the silicone RTV backing. Total normal lap joint force between the carbon bars is approximately 23 lb resulting in a contact pressure of 38 psi.

The carbon seal bars, 11, have a one inch cross section, are 11 inches long with a short 10 degree taper on each end and weigh approximately 0.63 lb. Each bar subtends 10 degrees of arc around the seal and overlaps adjacent bars with a 0.6 in. long lap joint. Thickness of the bars is closely controlled so that even at initial assembly all bars will be in contact with the rotating disc with a similar bearing pressure. Every lap joint is carefully fitted by sanding the joints while all bars are held in place in the housings.

As shown in FIG. 3, the tertiary seal, 38, with its respective ring of carbon seal bars, 12, is located outside the secondary seal, 33, and its ring of seal bars, 11, and employ a different shape and arrangement. There are 48 bars in each tertiary seal, 38, in a butt joint arrangement rather than the lap joint system used in the secondary seal, 33. The bars, 12, are 0.5 in. wide and are sealed into the housing groove with high temperature RTV. While these bars are fitted together tightly at assembly, the greater expansion of the steel housing will result in small gaps forming at each butt joint when the seal system operating temperature has been reached. Each gap is calculated to be 0.008 in. and provides an intentional small leak through the tertiary seal.

The tertiary seal, 33, forms the outer seal of the scavenge chamber. In-leakage through the gaps in the butt joints between carbon bars, 12, provides air to the seal air system as make-up air for that which is lost past the primary seal into the kiln. It also serves as a buffer to protect the secondary seal, 33, from larger particles of foreign matter.

Figure 4:
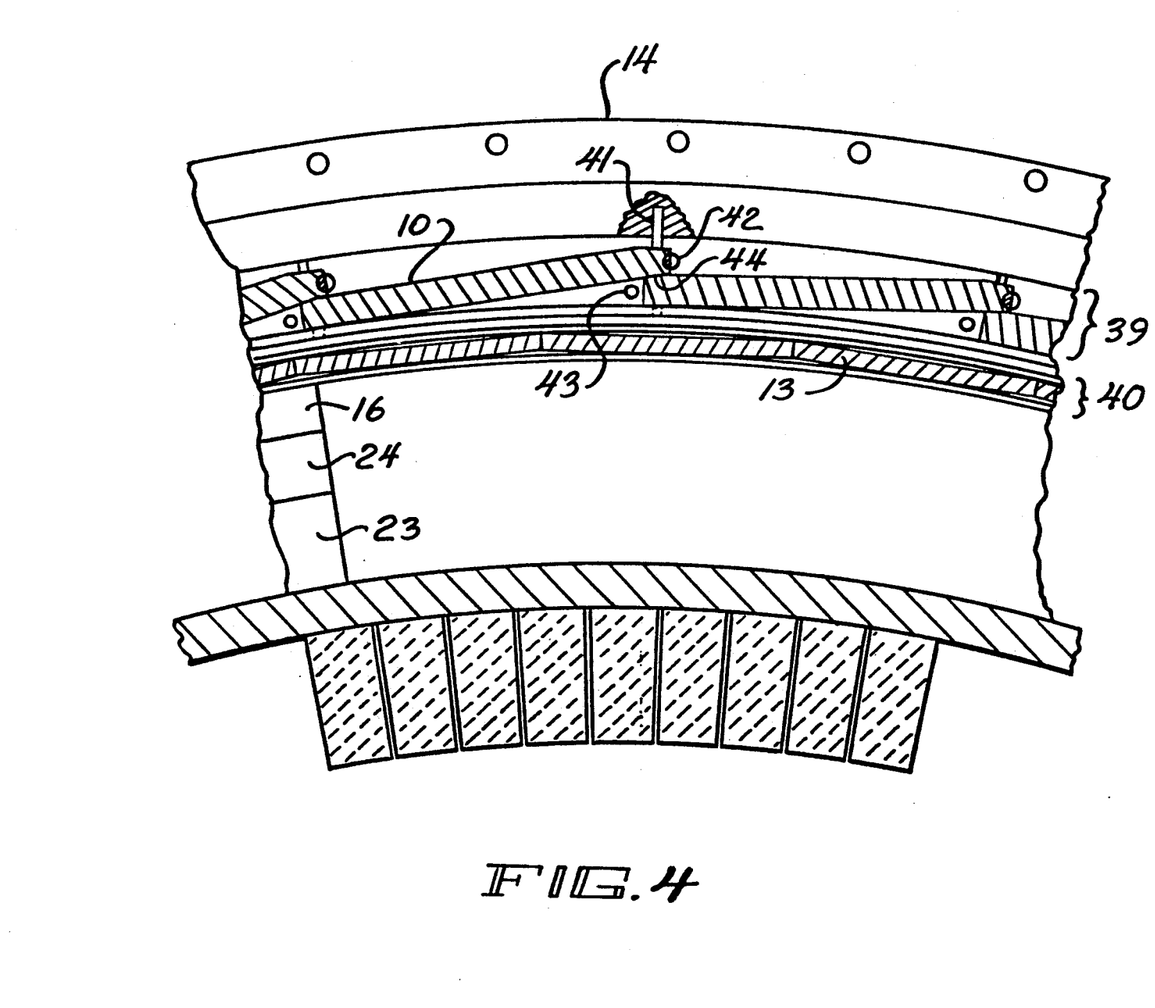
FIG. 4 is a cross sectional view taken along line 4—4 of FIG. 2 and depicts the positioning of the carbon seal bars as they appear in the primary housing in their relation to the rotary disc plate.
Figures 5A, 5B:
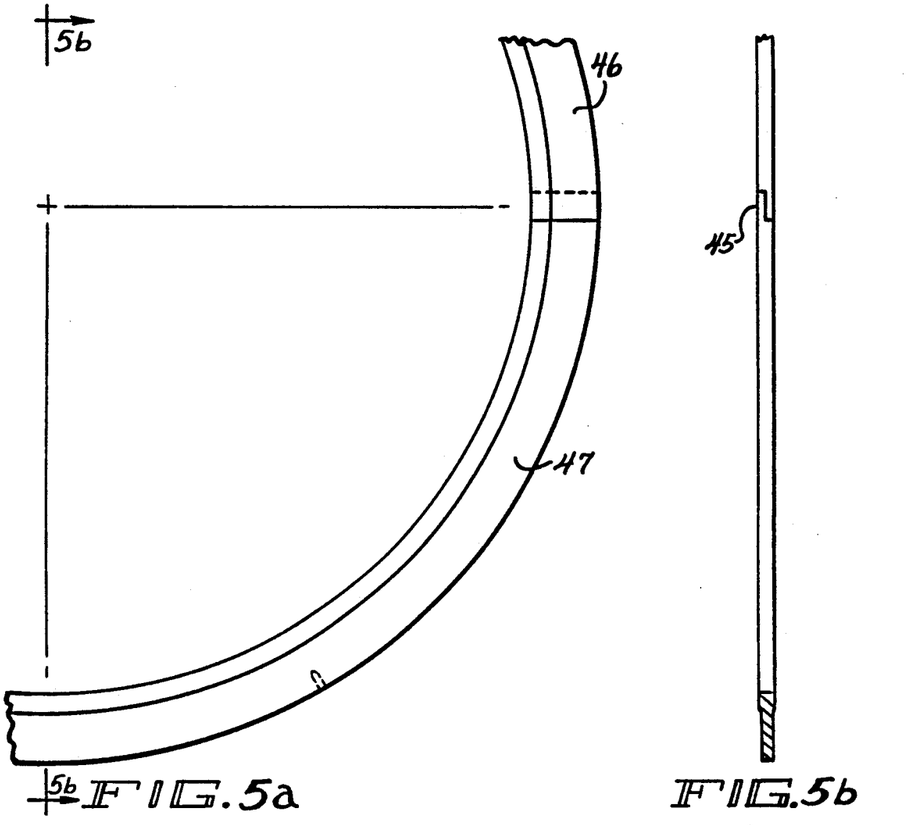
FIG. 5 depicts the rotary disc plate.
Figure 6A:
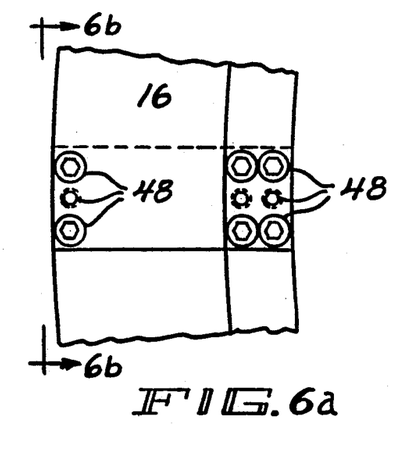
FIG. 6 shows the lap joint of the rotary disc plate.
Figure 6B:
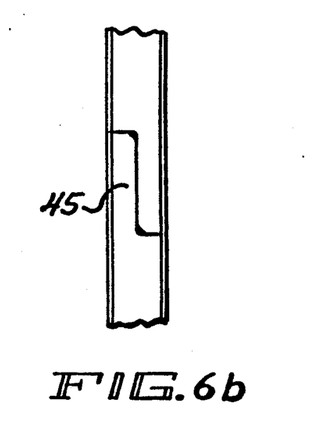

FIG. 4 shows the arrangement of the primary seal, 39, and the quad seal, 40, within the primary housing, 14.

The quad seal, 40, is internal to the primary seal, 39, and serves as a buffer to protect the primary seal, 39, from foreign objects generated in the kiln. The gaps between the butt jointed quad seal bars, 13, also tends to distribute the in-leakage to the kiln in a uniform pattern around the end plenum of the kiln and thus, reduces the accumulation of kiln dust migration into that area.

The quad seal, 40, also provides a pressure buffer to prevent pressure pulses from the kiln from reaching the primary seal, 39. The primary seal's, 39, lap joints, 44, are arranged to resist the leakage of seal air supplied by the seal air system into the kiln. However, in the event that a positive pressure develops on the kiln side of the primary seal relative to reference seal air pressure, the lap joints provide only a limited resistance to the flow of air from the kiln side past the primary seal. The coil springs, 41, at the lap joints and the reference seal air pressure will resist a kiln positive pressure of approximately 3.3 psi without aid of the carbon-to-housing RTV bond or friction from the disc.

After all joints have been fitted for the primary housing, 14, and secondary housing, 15, the high temperature silicone RTV bed is formed by removing the bars one at a time and uncured silicone RTV is applied to the housing where the bar was removed. Small precision cross section silicone rubber O-rings are placed in the liquid RTV and the carbon bar is then replaced in its proper location. The O-rings act as spacers to support each bar at the proper height above the housing while the liquid silicone RTV sets up to its rubbery consistency. The O-rings remain imbedded in the RTV. After all the RTV has cured, the housings 14 and 15 which are constructed in two halves may be separated for installation around the kiln. As shown in FIG. 2, the housing splice plates, 29, secure each half circle of the secondary housing, 15, to the other half to return to the full circle configuration. The bolted ring, 32, secures each half of the primary housing, 14, to the other half to form its full circle configuration.

Carbon material used for the bars is Pure Carbon P-2W, a commercial carbon graphite alloy. This alloy has a high graphite content for low friction, low abrasion, and long wear.

FIGS. 5a, 5b, 6a and 6b show the arrangement of the rotating disc plate, 16, and the step joint, 45. The disc, 16, is formed by attaching two half rings, 46 and 47, attached at step joint, 45, to form the full circle of the disc.

In order to make an effective seal, the surface of the disc, 16, which contacts the ring of carbon seal bars must be smooth and flat. Surface smoothness is important to prevent leakage past each individual bar, and to prevent excessive carbon bar wear, while the overall flatness is important to maintain contact with all the bars of the ring at all times. A small amount of flatness irregularity can be accommodated by the resilience of the RTV backing between the carbon bars and the housing. The flatness of 0.010 in. is probably the best that can be achieved on the 10 ft. diameter ring without extreme difficulty and expense. The 16 RMS surface finish on the seal zone of the disc, 16, is based on recommendation of the carbon bar manufacturer for minimum carbon wear. A 32 RMS finish would be acceptable with possibly some additional early wear of the carbon bars until the disc polish developed.

An extremely tight parallel tolerance is not necessary for the sides of the disc. The method of spring loading the housings, and their independent suspension, allow the housings to move to compensate for the varying thickness of the disc as long as each side of the disc is flat.

The step joints, 45, in the disc, 16, are necessary so that the disc can be put in place around the existing kiln. The step joints, 45, are designed to maintain alignment of the two disc halves. The disc fasteners, 48, as shown in FIG. 6, are recessed and are located outside the normal rubbing zone of the carbon bars. The disc, 16, in FIG. 5 is machine finished as a full circle to avoid seal surface discontinuities at the joints.

FIG. 7 shows the access ports for some of the attachments. The disc fasteners, 48, are accessible through a removable section, 49, of the outward facing flanges, 24. Access to the lower adjusting screw, 26, is attained through the access opening, 31.

Figure 8:
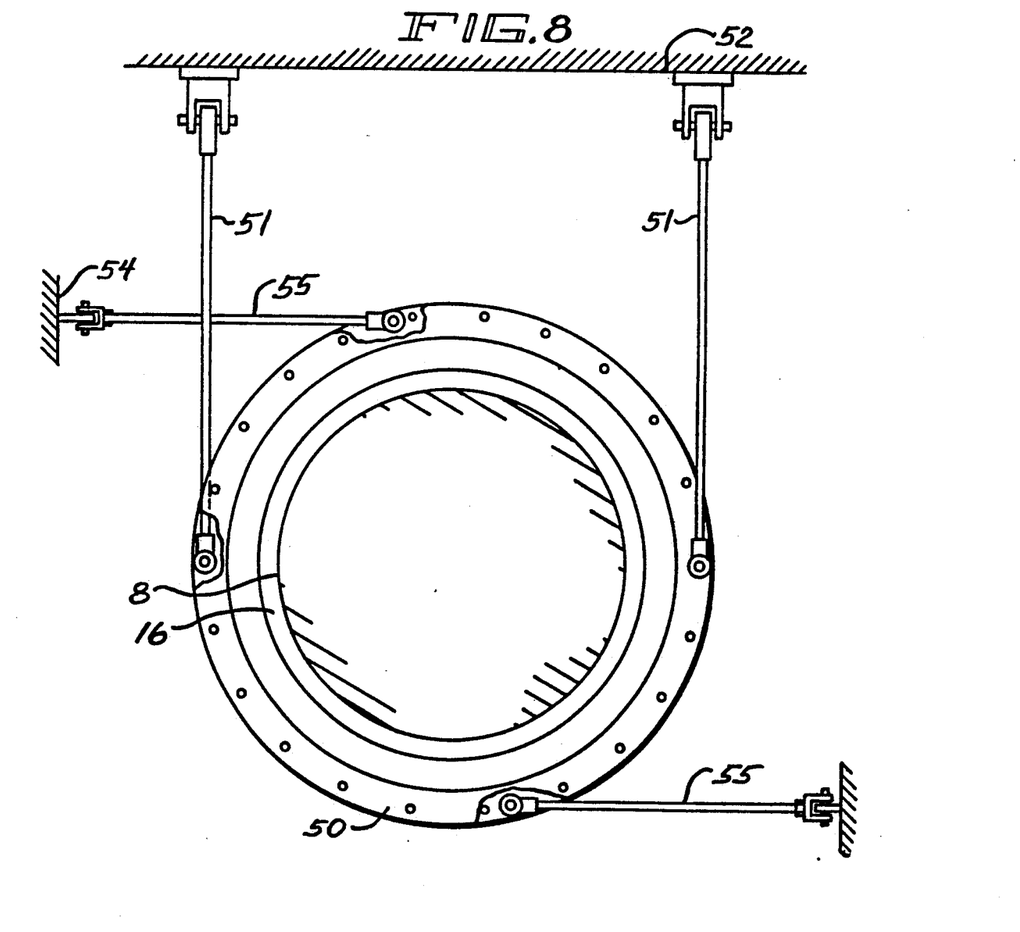
FIG. 8 illustrates the support mechanism for the rotating kiln seal.

FIG. 8 illustrates the support mechanism for the rotating kiln seal. The nonrotating housing, 50, is supported by a system of hangers, 51, which are attached to an overhead support structure, 52, and allow the nonrotating housing, 50, to follow the axial movement of the rotating disc plate, 16, and kiln shell, 8, while remaining at a constant elevation and orientation. Drag torque from the disc rubbing against the carbon bars is resisted by a system of torque arms, 55, which are attached to side wall supports, 54, and also permits the axial movement of the nonrotating housing, 50, but prevents its rotation.

The material selected for the rotating disc plate is 410 stainless steel. Because of the large size of the disc segments, and the flatness requirements, most carbon steel materials cannot be used due to warpage during the hardening process. The 410 stainless steel can be hardened to the necessary degree at a relatively low temperature, and is expected to be dimensionally stable during and after hardening. Machining and possibly grinding should be possible with this material to obtain the very smooth finish of 16 to 32 micro inch. A suitable alternate material is possibly Wearalloy-B, a proprietary manganese alloy steel.

The present enablement calls for the use of carbon on steel in a dry, unlubricated condition. The injection of water vapor or possibly a lubricant such as silicone aerosol into the seal air system could be used to reduce the carbon friction drag if necessary.

The seal face pressure (carbon pressure against the disc) is determined by the 36 preload springs, FIG. 2, 56, around the periphery of the nonrotating seal housing, 15. These springs, 56, are sized to have a relating low spring rate (168 lb/in.) so that frequent adjustment is not required. The reference operating condition force required is 150 lb per spring, and the maximum load due to a failed seal air pressure control is 312 lb. Safe load per spring is 550 lb. The nominal preload of 150 lb. would be established by approximately 10 turns of the adjusting nut, FIG. 1, 57,. One year's projected carbon wear could be compensated for by approximately 1.2 turns of the adjusting nut, 57.

The seal air pressure acting on the portions of the housing outside the primary and secondary seals and inside the inter-housing expansion joint membrane, generate a force which opposes the spring preload and reduces the face pressure on the carbon seal bars.

This arrangement allows great flexibility of operation of the seal system since the seal air pressure can be adjusted from outside the kiln room to increase or decrease the carbon bar face pressure from zero up to the maximum preload settings of the springs. Operation with higher face pressure or seal air pressure is possible by increasing the spring preload settings or lower pressures are possible by reducing the spring preload settings. Operating experience will determine the best balance of seal air and carbon face pressures for acceptable in-leakage vs. carbon wear rates.

The nonrotating seal housings are machined from carbon steel with grooves for the carbon seal bars, ledges for the inter-housing expansion joint membranes, and flanges with holes for the preload spring studs. The two housings for each seal assembly are mirror images similar except for clearance holes for the studs and seal air ports in the secondary-tertiary housing. Each housing is made in two half-circle ring segments to allow installation of the housings around the existing kiln. Heavy splice plates fasten the two ring halves together at 180 degree locations. The critical dimensions of the housings are the flatness of the bottom of the grooves for the carbon seal bars. Flatness and continuity across the splice joint are necessary to maintain a uniform height of the individual bars in the housing for proper contact with the rotating disc. In order to achieve the necessary flatness on both sides of the joint, finish machining of the housing grooves will be with the two housing halves assembled into the full housing ring.

The housing, carbon bar, and disc interfaces are such that the disc has clearance with the non-rotating parts of the seal to allow a 1.0 in. radial motion of the disc (and kiln) in any direction. This clearance is to accommodate kiln shell displacement such as was experienced when one of the kiln support roller bearings failed, pitching the kiln an estimated one-half inch off its normal axis.

Extended operation with the kiln axis off normal location would be expected to cause some additional carbon wear in the zone where the disc splice joint fastener holes would pass through the carbon bar area. These fastener holes are outside the zone of the disc on which the carbons normally rub, but the holes would be finished such that carbon wear would be minimized if the carbons did rub over the hole locations.

All of the non-rotating parts of the seal assembly (housing, carbon seal bars, expansion joints springs, etc.) must be supported, yet allowed to move axially with the disc and kiln shell. Hanger rods are attached to each seal housing on both sides near its centerline elevation. These rods are attached to overhead housing support structures which are mounted on the original kiln seal attachment flanges on the firing hood and the secondary combustion chamber. Ball end joints at the top and bottom allow free axial motion of the housings with the rotating disc.

To react against the drag generated by the disc rubbing against the carbon bars, and to keep the housings centered horizontally on the kiln centerline, torque rods are located at the top and bottom of each housing. The rods are anchored to steel plate structures attached to the original kiln seal mounting flanges on the firing hood and secondary combustion chamber, and to the original seal housing anchors. Ball joint rod ends are attached to the top and bottom of each housing flange, so that axial and vertical motions of the housings are unrestrained. Rods are sized to enable the seal housing to remain functional even with the loss of one of the hanger rod supports.

As shown in FIG. 2, two expansion type joints, 19 and 30, respectively are used in each kiln seal assembly. The smaller of the two, 30, spans the gap between the two seal housings, 14 and 15, and retains the seal air pressure. This joint accommodates expansion and contraction of the disc thickness due to thermal effects and manufacturing parallelism tolerances, and it also allows the housings halves to move together as the carbon bars wear.

The expansion joint, 30, is a belt of high strength, high temperature material. The material
currently recommended for the joint is Pyrotek F-1 Fiberseal Fabric, a propriety product, which is a high temperature rubber-like material with a fiberglass fabric core. The joint is attached to the housings with RTV adhesive sealer and bolted backing bar clamps. The membrane joint is a flat belt or band and in order for it to resist the overpressure of the seal air system blower, it has to be able to expand to a larger hoop diameter in its middle section. To achieve this portion of a torroidal shape, the material must be able to stretch in the hoop direction until the pressure load can be carried across the narrow gap between the housings.

The wide expansion joint, 19, between the primary housing and the end structures is a fabric reinforced molded viton, high arch element; the high arch shape resulting from having to meet the pressure pulse from inside the kiln as well as the relatively long 1.5 in. stroke.

While the large joint material is protected from the kiln environment by thick insulation blankets, in-leakage through the primary seal will also tend to purge the annulus between seals and kiln shell and thus, keep the material cool.

Both seal membranes must have construction joints field vulcanized around the kiln shell.

One important aspect of the rotary kiln seal is its use of carbon seal bars contacting a rotating disc in conjunction with a seal air system to form a positive seal. This arrangement allows the kiln to rotate and expand radially while still maintaining a positive seal. As the kiln and the disc expand radially, the carbon bars maintain contact with the surface of the disc while the seal air system maintains a positive pressure with respect to the interior of the kiln. These two parts of the apparatus combine to exclude contaminants from the external environment. Previous seal designs were not able to experience a radial movement and still maintain a positive seal.

Another important aspect associated with the rotary kiln seal is its use of the rotating disc, 16, to form the interface between the kiln shell and the stationary carbon seal bars. Previously, a thermal sleeve formed the interface between the rotary kiln and the seal. This subjected the thermal sleeve to high temperature gradients and high drag torques from the sealing bars creating an area of high stress and probable structural failure. The use of the thermal standoff, a high temperature RTV bed and a rotating disc improves the past deficiencies by reducing the thermal gradient effecting the member and by providing a more uniform loading of the member. Thus, reducing the chance for failure.

While the preferred embodiments of the invention are disclosed, various modes of carrying out the principles disclosed herein are contemplated as being within the scope of the following claims. Therefore, it is understood that the scope of the invention is not to be limited except as otherwise set forth in the claims.

The embodiments of the invention in which an exclusive property or privilege is claimed are defined as follows:

1. A rotary seal apparatus to provide a positive seal between a rotating member and a non-rotating member comprising:
   a rotating disc plate attached to the rotating member;
   a nonrotating housing with an interior and an exterior surface formed by linking a primary housing with a secondary housing by means of a plurality of connecting members where said connecting members bridge a gap between said primary and said secondary housing and where said nonrotating housing envelops said disc plate;
   a plurality of seal bars linking the interior surface of said nonrotating housing with said disc plate in such a manner that said seal bars contact both said rotating disc and said nonrotating housing;
   a preloaded spring means where said preloaded spring means is coupled to said connecting members whereby the force generated by said preloaded spring means determines the pressure exerted by said seal bars on said rotating disc and where the force generated by said preloaded spring means is adjustable;
   a first membrane joining an exterior surface of said primary housing to an external surface of the nonrotating member to form a hermetic, nonrotating seal between said primary housing and said external surface;
   a second membrane joining said primary housing with said secondary housing to form an hermetic, nonrotating seal;
   a means for coupling an air supply and an air scavenge system to said nonrotating housing to insure contaminants do not pass the seals and enter the external environment;

a means for coupling an external support structure to said nonrotating housing to provide support for said nonrotating housing;

a means for preventing the rotation of said nonrotating housing which would result from a rotational torque generated by the frictional forces between said seal bars and said rotating disc plate.

2. The rotary seal of claim 1 where said rotating disc plate is coupled to the rotating member by a double channel member in such a manner that a larger channel of said double channel member is rigidly attached to the rotating surface and an opposing smaller channel of the double channel member is used to hold said rotating disc plate in the correct alignment.

3. A rotary seal apparatus to provide a positive seal between a rotating member and a nonrotating member comprising:

a rotating disc plate attached to the rotating member where said rotating disc plate is coupled to the rotating member by a double channel member in such a manner that a larger channel of said double channel member is rigidly attached to the rotating surface and an opposing smaller channel of the double channel member is used to hold said rotating disc plate in the correct alignment and where said rotating disc plate is imbedded in a bed of silicone RTV contained within said smaller channel;

a nonrotating housing with an interior and an exterior surface formed by linking a primary housing with a secondary housing by means of a plurality of connecting members and where said nonrotating housing envelops said disc plate;

a plurality of seal bars linking the interior surface of said nonrotating housing with said disc plate in such a manner that said seal bars contact both said rotating disc and said nonrotating housing;

a first membrane joining an exterior surface of said primary housing to an external surface of the nonrotating member to form a hermetic, nonrotating seal between said primary housing and said external surface;

a second membrane joining said primary housing with said secondary housing to form an hermetic, nonrotating seal;

a means for coupling an air supply and an air scavenge system to said nonrotating housing to insure contaminants do not pass the seals and enter the external environment;

a means for coupling an external support structure to said nonrotating housing to provide support for said nonrotating housing and to permit axial movement of said nonrotating housing;

a means for preventing the rotation of said nonrotating housing which would result from a rotational torque generated by the frictional forces between said seal bars and said rotating disc plate where said rotation prevention means permits axial movement of said nonrotating housing.

4. The rotary seal of claim 1 where said primary housing supports a primary seal which is formed by a plurality of primary seal bars and a quad seal which is formed by a plurality of quad seal bars with said primary seal at a greater radial distance from the rotating member than said quad seal with the effect that the entrained substance first contacts the quad seal and second the primary seal.

5. The rotary seal of claim 4 where said secondary housing supports a secondary seal which is formed by a plurality of secondary seal bars and a tertiary seal which is formed by a plurality of tertiary seal bars with said secondary seal at a greater radial distance from the rotating member than said tertiary seal with the effect that any air from the external environment first contacts the tertiary seal and second the secondary seal.

6. The rotary seal of claim 5
where said primary and said secondary seals are constructed of a series of primary and secondary seal bars where each of said primary and secondary seal bars has a head located at one end and a tail at the opposing end and where said bars are linked together by a sequence of lap joints the head of one bar overlapping the tail of the next bar in sequence, where a spring internal to said primary and said secondary housing compresses the two seal bars together at said lap joint, and where the bar is further constrained by a set of forward and reverse stop pins positioned at the head and tail of the bars to prevent slippage of the bars during forward and reverse rotation of the rotating disc plate.

7. The rotary seal of claim 6 where said tertiary and quad seals are constructed of a series of tertiary and quad seal bars where each of said tertiary and quad seal bars has a head at one end and a tail at the opposing end and where said bars are linked by a sequence of butt joints the head of one contacting the tail of the next in sequence resulting in a permeable seal.

8. The rotary seal of claim 4 where said seal air system includes a seal air outlet which transcends the secondary housing and exits into a chamber formed by said primary and secondary seals, said rotating disc plate, said primary and secondary housings and said second membrane wherein flow from the seal air system through said outlet creates a positive pressure across the primary seal and where a seal air inlet for said seal air system transcends the secondary housing and draws air from a chamber created by said secondary housing, said secondary seal, said rotating disc plate and said tertiary seal.

9. The rotary seal of claim 1 where the external support for said nonrotating housing is accomplished by a plurality of hangers connecting said nonrotating seal housing to a vertical support structure and where said hangers are configured to permit axial movement of said nonrotating housing.

10. The rotary seal of claim 1 where said rotational prevention means is accomplished through the use of a plurality of torque arms linking the nonrotating seal housing to a lateral support structure where said torque arms are oriented perpendicular to an axis of rotation of said rotating member and are configured to permit axial movement of said nonrotating housing.

* * * * *